June 3, 1958  B. C. McKEE  2,837,371
DOOR EDGE PROTECTORS FOR AUTOMOBILES
Filed Aug. 8, 1955
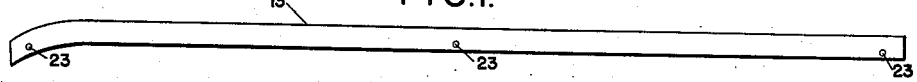
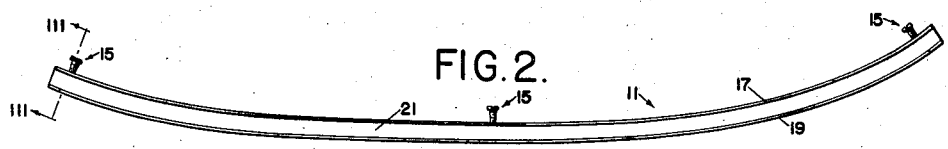
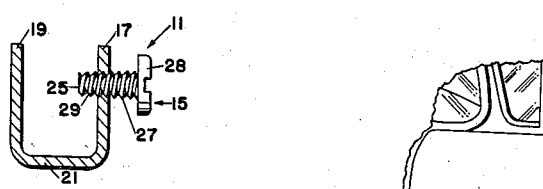
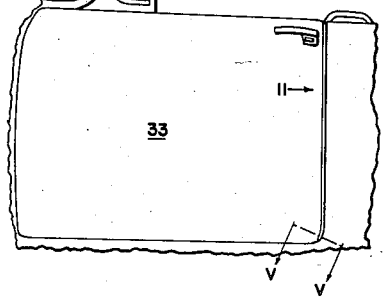
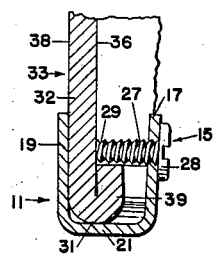
INVENTOR.
BENJAMIN C. McKEE

United States Patent Office 2,837,371
Patented June 3, 1958

2,837,371

DOOR EDGE PROTECTORS FOR AUTOMOBILES

Benjamin C. McKee, Memphis, Tenn.

Application August 8, 1955, Serial No. 526,888

4 Claims. (Cl. 296—44)

This invention relates to door edge protectors adapted for use on the edges of the doors of automobiles, and particularly their free edges, to prevent the chipping of paint from said edges and to serve as ornamental trim for the doors.

Heretofore various methods have been employed for removably attaching door edge protectors to the doors of automobiles. None have met with wide commercial success because the attaching means has necessitated the permanent and irreparable marring of the doors, as for example by the drilling of holes in the lip portions or in the transverse end portion of the doors for the insertion of the attaching means. Thus, if for any reason it is desired to remove the protectors, the doors are left with unsightly holes. Also, as is known to those skilled in the art, there has been an ever present problem of properly fitting the protectors to the different contours of the doors caused by variations in manufacture. This problem has heretofore not been fully solved and is particularly prevalent in the recent model cars which are provided with doors and bodies of irregularly shaped contours. Additionally, in installing the door edge protectors on the automobile doors there has been the problem of making a snug fit between the outer flange of the protector and the exterior portions of the door.

The present invention is directed towards providing a door edge protector which overcomes the above mentioned difficulties and problems.

The principal object of the present invention is to provide an improved door edge protector.

A further object is to provide such a door edge protector wherein improved means is provided for attaching the protector on an automobile door, said improved means comprising a plurality of screws engaged in apertures in one flange of the channel-shaped strip of said protector for clampingly engaging the lip portion of a door between the other of the flanges of the strip and the ends of the screws, thereby eliminating the necessity of drilling holes in the door and providing an easy and convenient means for removably attaching the door edge protector.

A further object is to provide such a door edge protector in which the spacing between the flanges of the channel-shaped strip of the protector is sufficient to receive the lip portion of a car door regardless of the manufacturing variations in shape and thickness of the lip, and yet by virtue of the adjustability of the attaching screws the edge protector may be firmly clamped to the door lip.

A further object is to provide such a door edge protector which will insure the snug fitting of the outer flange of the protector against the exterior of the door edge portion, said snug fitting being insured by the screw members which are engaged in one flange of the protector thrusting against the interior of the door edge portion to pull the outer flange of the protector against the exterior of the door edge portion.

A further object is to provide in such a door edge protector means for preventing the undesired loosening of the protector from the door, said means comprising a plurality of screws each having an enlarged section which is greater in diameter than each of the apertures in which engaged whereby the screws upon advancement in the apertures will become jammed therein to prevent said undesired loosening.

A further object is to provide a sufficient spacing between the apertures and the web of the channel-shaped strip so that the screws engaged in said apertures will engage the lip of the door inward of a folded over end or other enlargement of the lip whereby the enlargement will limit outward movement of the screws to prevent accidental removal or separation of the protector from the door.

A further object is to generally improve the design and construction of automobile door edge protectors.

The means by which the foregoing and other objects of the present invention are accomplished and the manner of their accomplishment will be readily understood from the following specification upon reference to the accompanying drawings, in which:

Fig. 1 is a side elevational view of the door edge protector of the present invention with the attaching screws removed.

Fig. 2 is a front elevational view of the protector.

Fig. 3 is an enlarged sectional view taken as on the line III—III of Fig. 2.

Fig. 4 is a fragmentary side elevational view of an automobile illustrating the protector mounted on a door of the automobile.

Fig. 5 is an enlarged fragmentary cross sectional view on the same scale as Fig. 3 taken as on the line V—V of Fig. 4.

Referring now to the drawings in which the various parts are indicated by numerals, the door edge protector 11 of the present invention comprises in general an elongated strip 13 carrying a plurality of screws 15. Strip 13 is formed from a suitable resilient material, as for example, stainless steel or the like, bent substantially to a channel shaped transverse cross section and longitudinally shaped to conform to the contour of an automobile door edge.

One form of strip 13 tailored to fit the door of a recent model car having a protuberant body is best illustrated in Figs. 1 and 2. It will be understood that the particular form shown in Figs. 1 and 2 is only for purposes of illustration and that the strip may be formed in its longitudinal dimension to substantially conform to the shape of the particular door on which the strip is to be used. As for example, the strip may be substantially straight for use with earlier model cars having substantially flat doors. However, the cross sectional shape in all forms is preferably channel shaped as illustrated.

Strip 13 consists of an inner flange 17 and an outer flange 19 substantially parallel to the inner flange and connected by a web portion 21 which is preferably rounded. Flanges 17, 19 are spaced apart and are substantially coextensive in length. The spacing between inner flange 17 and outer flange 19 is greater than the maximum width of the trailing lip of an automobile door, whereby flanges 17, 19 are adapted to loosely receive said lip regardless of the manufacturing variations in the dimensions of the door. Inner flange 17 is drilled to provide a plurality of longitudinally spaced apertures 23 adapted to threadedly receive screws 15. The threaded portion of each of screws 15 is tapered towards its end 25 to provide an enlarged section 27 adjacent head 28 of the screw, and a reduced section 29 adjacent end 25. The cross sectional diameter of each of screws 15 as measured along enlarged section 27 is greater than the diameter of each of apertures 23, and the cross sectional diameter of each of screws 15 as measured along reduced section 29 is smaller than the diameter of each of apertures 23, whereby screws 15 may be respectively threadedly engaged in apertures 23 as best illustrated in Fig. 3.

In using door edge protector 11, strip 13 is placed over the edge 31 of the lip portion 32 of a door 33, as best illustrated in Figs. 4 and 5. Screws 15 are respectively advanced in apertures 23 whereby ends 25 will be engaged with the inner face 36 of the door lip portion 32 and will thrust against inner face 36 to pull outer flange 19 snugly against the outer face 38 of lip 32 and anchor protector 11 to lip 32.

Screws 15 are preferably of a length which will cause inner flange 17 and outer flange 19 to be sprung apart slightly by the action of screws 15 against lip 32, whereby the lip will be clampingly held between outer flange 19 and screw ends 25. It will be understood that the proper length of screws 15 to accomplish the above mentioned result will be such that when screws 15 are in a fully advanced position in apertures 23 and the protector 11 is not attached to lip 32, the distance between screw ends 25 and outer flange 19 is less than the width of lip 32.

A number of automobile doors are constructed with the ends of the door lips folded over upon themselves. This type of construction is best illustrated in Fig. 5 wherein the folded end is indicated as at 39. Some automobile doors are constructed with a greater width of folded over portion than illustrated but a beading or raised edge is formed in the bight of the folded over portion which accomplishes the result hereinafter described. In either event, the lip of the door includes an enlargement of which the folded over portion is an illustrative example. The transverse spacing of apertures 23 from rounded web 21 is greater than the width of folded over enlargement 39, whereby as best illustrated in Fig. 5, screws 15 will engage inner face 36 inwardly of enlargement 39. Thus it will be seen enlargement 39 will limit outward movement of screws 15 to prevent accidental removal or separation of protector 11 from door 33. Similarly, in doors constructed with a greater width of folded over portion, screws 15 will engage the folded over portion inwardly of the beading which will prevent the accidental removal of protector 11 from the door.

In advancing screws 15 from the position illustrated in Fig. 3 to the secured position as best illustrated in Fig. 5, it will be understod that screws 15 will be jammed in apertures 23 since the diameter of enlarged section 27 is greater than the diameter of apertures 23. Thus screws 15 will be held securely in apertures 23 and will not accidentally become loosened, as for example, by the vibration of the automobile. If it is desired for any reason to subsequently remove the door edge protector 11 from door 33 screws 15 are reversely rotated and protector 11 removed without any permanent damage to or marring of the door.

From the foregoing description it is apparent that a door edge protector is provided which is both ornamental and useful. Such a door edge protector is provided which has improved means for attachment to a door requiring no special tools, and which is easily and conveniently attached and removed from the door without any drilling of holes, welding or the like, which would permanently mar the door. Furthermore, such means is provided which insures a snug fit between the door edge protector and the exterior door edge portion and which securely anchors the door protector against accidental removal thereof.

I claim:

1. In an automobile door having an edge, a door edge protector comprising a strip of resilient metal having a channel-shaped cross section and being longitudinally contoured to the shape of the edge of said automobile door; said strip including an inner flange, an outer flange spaced from said inner flange, and a rounded web connecting said inner flange and said outer flange; said outer flange engaging a portion of the exterior of said door adjacent the edge thereof, said rounded web fitting over said edge, said inner flange being drilled to provide a plurality of threaded apertures, a plurality of screws respectively threadedly engaged in said apertures, each of said screws including a head and a threaded portion terminating in an end portion, said threaded portion being tapered towards said end portion, the cross sectional diameter of each of said screws, as measured along a major length of said threaded portion extending from said head, being greater than the diameter of each of said apertures whereby said screws are self-tapping and jammed in said apertures to prevent the undesired loosening of said screws, said end portion engaging the portion of the interior of a door adjacent the edge thereof for anchoring the edge protector to said door, said outer and inner flanges being sprung apart by said screws whereby said protector is clampingly held on said door edge.

2. In an automobile door having an edge, a door edge protector comprising a strip of resilient metal having a channel-shaped cross section and being longitudinally contoured to the shape of the edge of said automobile door; said strip including an inner flange, an outer flange spaced from said inner flange, and a rounded web connecting said inner flange and said outer flange; said outer flange engaging a portion of the exterior of said door adjacent the edge thereof, said rounded web fitting over said edge, said inner flange being drilled to provide a plurality of threaded apertures, a plurality of screws respectively threadedly engaged in said apertures, said screws engaging the portion of the interior of a door adjacent the edge thereof for anchoring the edge protector to said door, said inner and outer flanges being sprung apart by said screws against the resiliency of said metal whereby said protector is clampingly held on said door edge, the resiliency of said metal urging said flanges to return from sprung apart condition to maintain said outer flange snugly against said door lip.

3. In combination, an automobile door having a contoured lip, said lip being folded over upon itself to provide a folded edge portion along the length thereof, a door edge protector, said protector being elongated and longitudinally contoured to the shape of said contoured lip; said protector being formed of a resilient material and comprising an inner flange, an outer flange spaced from said inner flange, and a rounded web joining said flanges; said flanges and web being substantially coextensive in length, said inner flange being apertured to provide a plurality of longitudinally spaced apertures respectively spaced transversely away from said web, a like plurality of screw threaded members respectively engaging said apertures and extending towards said outer flange, said screw threaded members being of a length less than the spacing between said flanges; said protector, flanges and web embracing the door lip with said screw threaded members thrusting against one side of the door lip closely adjacent said folded edge portion, said outer flange being pulled snugly against the other side of the door lip and said outer and inner flanges being sprung apart under the influence of said thrusting against the resiliency of said material, whereby said protector is clampingly held on said door lip, the resiliency of said material urging said flanges to return from sprung apart condition to maintain said outer flange snugly against said door lip.

4. In combination, an automobile door having a lip, said lip being folded over upon itself to provide a folded edge portion along the length thereof, a door edge protector comprising a strip of resilient metal having a channel-shaped transverse cross section and being longitudinally contoured to the shape of the lip of said automobile door; said strip including an inner flange, an outer flange spaced from said inner flange, and a rounded web connecting said inner flange and said outer flange; said outer flange engaging a portion of the exterior of said door adjacent the lip thereof, said rounded web fitting over said lip, said inner flange being drilled to provide a plurality of threaded apertures, a plurality of screws respectively engaged in said apertures, said screws engaging a portion of the interior of said door closely adjacent said folded edge portion to anchor said protector on said door, said folded portion limiting outward movement of said screws to prevent accidental separation of said protector from said door, said outer and inner flanges being sprung apart by said screws against the resiliency of said metal, whereby said protector is clampingly held on said door lip, the resiliency of said metal urging said flanges to return from sprung apart condition to maintain said outer flange snugly against said door lip.

References Cited in the file of this patent

UNITED STATES PATENTS

| | | |
|---|---|---|
| Re. 20,580 | Brown | Dec. 14, 1937 |
| 2,177,112 | Johnstone | Oct. 24, 1939 |
| 2,238,306 | Braswell | Apr. 15, 1941 |
| 2,594,491 | Persons | Apr. 29, 1952 |
| 2,685,472 | Adell | Aug. 3, 1954 |
| 2,733,097 | Stevens | Jan. 31, 1956 |